UNITED STATES PATENT OFFICE.

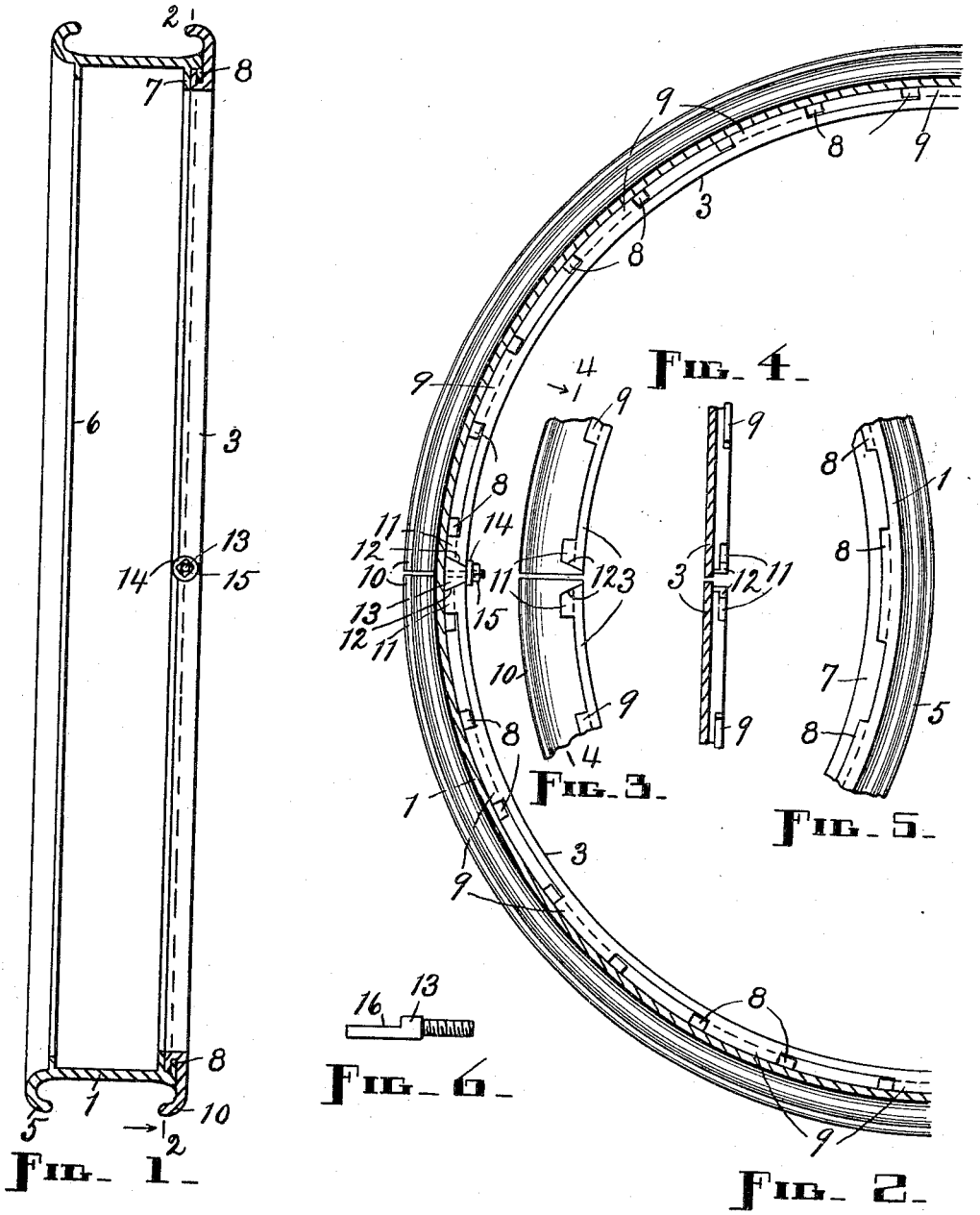

ROBERT M. KEATING, OF SPRINGFIELD, MASSACHUSETTS.

WHEEL-RIM.

1,205,903.

Specification of Letters Patent.

Patented Nov. 21, 1916.

Application filed February 27, 1914. Serial No. 821,528.

*To all whom it may concern:*

Be it known that I, ROBERT M. KEATING, a citizen of the United States of America, residing at Springfield, in the county of Hampden and State of Massachusetts, have invented a new and useful Wheel-Rim, of which the following is a specification.

My invention relates to improvements in pneumatic-tire rims, which are more especially designed for wire wheels, and consists of a flanged band provided with a series of interior lugs, a flanged ring split and provided with interior lugs to interlock with said first-mentioned lugs, and means to spread and so fasten said ring in place, all as hereinafter set forth.

The object of my invention is to produce a light-weight metallic rim made of comparatively thin material, which is strong, durable, and sufficiently stiff and rigid, such rim being particularly well adapted for wheels commonly known as wire wheels.

A further object is to provide a rim of this kind with convenient and practicable means for attaching to or mounting thereon a tire of the pneumatic type, and for detaching from or dismounting such tire.

Ample provision is made in this rim for resistance to all reasonable strain, that is, to such strain as a wheel and its rim are ordinarily liable under the varied conditions of use to which they are commonly put, so that there is practically no liability of breaking or unduly yielding under crushing forces or lateral stress, or of having the detachable member broken or wrenched from the member to which said detachable member is secured.

Other objects and advantages will appear in the course of the following description.

I attain the objects and secure the advantages of my invention by the means illustrated in the accompanying drawings, in which—

Figure 1 is a cross-section through a wheel rim that embodies a practical form of my invention; Fig. 2, a section at right-angles to that shown in the first view, taken on lines 2—2, looking in the direction of the associated arrow, in said first view, and showing one-half of the circumference of the parts appearing in this the second view; Fig. 3, an inside elevation of the terminal portions of the ring; Fig. 4, a longitudinal section, on lines 4—4, looking in the direction of the associated arrow, Fig. 3; Fig. 5, an outside elevation of a fragment of the band, and, Fig. 6, an enlarged elevation of the spreader, as viewed edgewise.

Similar numerals designate similar parts throughout the several views.

This rim comprises a band 1 and a split ring 3, the latter being securely attached to the former by means of certain interlocking lugs and expanding means, as will presently be explained.

The band 1, at what may be termed the inner edge, because it is the edge that is next to the body of the vehicle, when a wheel of which said band forms a part is in place, is turned outwardly beyond the periphery of said band to form a tire flange 5, of ordinary shape and structure. Preferably the band 1 is provided on the inside, at or adjacent to the junction of the flange 5 with the band proper, with an annular stiffening and strengthening rib 6, and also on the inside, a short distance in from the edge which is opposite to the edge from which said flange extends, or the outer edge, with a second stiffening and strengthening rib 7. The band 1, at or adjacent to the aforesaid outer edge, is further provided with a plurality of inwardly-extending or radial lugs 8. The lugs 8 are equidistant from each other, and are designed to receive behind them a series of lugs 9 with which the ring 2 is provided, there being sufficient space between the rib 7 and said lugs 8 to receive said lugs 9.

The outer ends of the wheel spokes are attached to the band 1, but since such spokes and the attaching means therefor form no part of this invention the same are not herein shown.

The ring 3 has a tire flange 10 to correspond with the flange 5 on the band 1 and coöperate with the latter flange in holding a tire in place on said band.

The inner peripheral part of the ring 3 is wider than the outer peripheral part, from which latter the flange 10 is formed, and the lugs 9 rise from the interior edge of such wider part, thus leaving space between the narrow radial wall of said ring and said lugs, which latter it should be noted in passing are also radial and therefore parallel with said wall, to receive the lugs 8. Included with the lugs 9 or in the same set are two lugs 11 which are located on opposite sides of the transverse split in the ring 3, or at the ends of said ring, as clearly shown in Figs. 2, 3 and 4. The lengths combined of the lugs 11 approximately equal the length of any lug 9. The ring lugs, including the lugs 9 and the pair of lugs 11, are practically equidistant from each other, and the proportions of parts are such that said lugs, including said pair, are receivable in the spaces between the lugs 8, and the latter are receivable in the spaces between said ring lugs. Thus it is seen that the ring 3 can be positioned so that the lugs 9 and 11 and the lugs 8 can pass each other laterally, and then pushed up against the outer face of the band 1 and turned in either direction to move the ring lugs longitudinally or circumferentially in behind the band lugs. With the lugs interlocked in this manner, the ring is able to withstand any lateral strain that it might be subjected to without becoming separated from the band. Upon turning the ring to disengage its lugs from the lugs 8, said ring can be removed from the band without difficulty.

In the present construction, the ring 3, when in position, bears against the rib 7 as well as against the outer face of the band 1.

In order to secure the ring 3, after the same has been attached to the band 1 by interlocking the lugs 9 and 11 with the lugs 8, and prevent said ring from rotating and so disengaging the interlocking lugs, I provide means to spread or expand said ring, by separating its ends, and thus cause said ring to engage frictionally said band with the required amount of force. When the ring 3 is thus expanded, the outer edges of the lugs 9 and 11 may be in forcible engagement with the annular wall of the band 1 which is between the rib 7 and the lugs 8, or the inner edges of said lugs 8 may be in forcible engagement with the annular wall of said ring which is between the radial wall thereof and said lugs 9 and 11, or both of these engagements may obtain.

As expanding means for the ring 3, I utilize the lugs 11 by including their adjacent ends, as shown at 12, to form a wedge-shaped opening or space, and provide a spreader 13, washer 14 and nut 15. The spreader 13 is made wedge-shaped to fit between the inclined edges 12 of the lugs 11, and is cut away on what is the outer side, as shown at 16, in Fig. 6, to make room for the lug 8 which comes in front or outside of said lugs 11, when said spreader is in place and the parts are all properly assembled. The shank of the spreader 13 is screw-threaded to receive the nut 15.

Before the ring 3 is placed in engagement with the band 1 and locked thereto, through the medium of the lugs 9 and 11 and 8, the spreader 13 is inserted between the tapered ends of said lugs 11. The ring 3 is of a convenient size, when unexpanded, except a little possibly by the presence of the spreader 13, to be readily engaged with the band 1. After the ring 3 is brought into engagement with the band 1 and partially rotated properly to interlock the two sets of lugs, the washer 14 and the nut 15 are placed on the shank of the spreader 13, if not already thereon, and said nut is turned to draw said spreader forcibly inward or toward the axis of the rim, as far as possible or practicable. This action or operation causes the ends of the ring 3 to be crowded farther apart, owing to the shape of the spreader 13 and the space between the lugs 11, and the peripheral parts of said ring to be forced tightly into contact with the band 1. The nut 15 and washer 14 are inside of the ring 3, the spreader 13 being radial to said ring, and said nut acts against said washer while the latter bears on the inner periphery of said ring. The spreader 13 is held laterally between the inner peripheral part of the ring 3 and the contiguous lug 8, on the outside, and the rib 7, on the inside; said spreader is confined between the tapered parts 12, at its tapered edges; and the contacting tapered members and the nut 15 and washer 14 prevent radial or endwise movement of said spreader. The spreader 13 occupies space in the band 1 which corresponds with that occupied by the lugs 11.

By unscrewing the nut 15 and loosening the spreader 13, the tension on the ring 3 is relieved or removed and said ring thus released from forcible engagement with the band 1 can be turned into position to unlock or disengage the two sets of lugs.

In practice, while the ring 3 is off, a tire is mounted on the band 1, and then said ring is placed in position and secured by the lugs 8 and 9 and 11 and with the aid of the spreader 13 and the nut 15. A tire thus mounted is held securely on the band 1 by the flanges 5 and 10.

The removal of a tire is effected by loosening the spreader and ring, rotating the latter far enough for the ring lugs to clear the band lugs, taking said ring off of or away from the band 1, and withdrawing the tire from said band.

In the present construction, the lugs 8 extend inwardly from the outer edge of the band 1.

Such changes in the shape, size, arrangement, and construction of the rim, as may be required to meet different conditions, may be made, without departing from the spirit of my invention, provided the scope of my claims be not exceeded.

What I claim as my invention, and desire to secure by Letters Patent, is—

1. A wheel rim comprising a band having a tire-engaging part, and provided with inwardly-extending lugs at or adjacent to the outer edge of said band, and with an annular rib behind and separate from said lugs, a ring having a tire-engaging part, and provided with outwardly-extending lugs arranged and adapted to be laterally and circumferentially moved into engagement with said first-mentioned lugs, and to occupy the spaces between said rib and said first-mentioned lugs, and to be circumferentially and laterally moved out of such engagement, and wedge-shaped means, radial to the wheel, to secure said ring against rotation when said means is actuated inwardly, and to release the same when said means is released and permitted to move outwardly.

2. A wheel rim comprising a band having a tire-engaging part, and provided with inwardly-extending lugs, a split ring having a tire-engaging part, and provided with outwardly-extending lugs arranged and adapted to be laterally and circumferentially moved into engagement with and circumferentially and laterally moved out of engagement with said first-mentioned lugs, and wedge-shaped expanding means for said ring, said expanding means being operative, when forced inwardly toward the center of the wheel, to separate the ends of said ring.

3. The combination, in a wheel rim, with a band having a tire-engaging part, and provided with inwardly-extending lugs, of a split ring having a tire-engaging part, and provided with outwardly-extending lugs, two of the latter being at the ends of said ring, and said ring lugs being arranged and adapted to be laterally and circumferentially moved into engagement with and circumferentially and laterally moved out of engagement with said band lugs, a spreader between said lugs at the ends of said ring, and actuating means for said spreader.

4. The combination, in a wheel rim, with a band having a tire-engaging part, and provided with inwardly-extending lugs, of a split ring having a tire-engaging part, and provided with outwardly-extending lugs, two of the latter being at the ends of said ring and being tapered to form a wedge-shaped opening between them, a wedge-shaped spreader capable of fitting said space, said ring lugs with said spreader being arranged and adapted to be laterally and circumferentially moved into engagement with and circumferentially and laterally moved out of engagement with said band lugs, and means to actuate said spreader to expand said ring.

ROBERT M. KEATING.

Witnesses:
A. C. FAIRBANKS,
F. A. CUTTER.